United States Patent Office 3,203,764
Patented Aug. 31, 1965

3,203,764
PROCESS FOR RECOVERY OF BORON HALIDES
Carl B. Linn, Riverside, and George L. Hervert, Downers Grove, Ill., assignors to Universal Oil Products Company, Des Plaines, Ill., a corporation of Delaware
No Drawing. Filed Oct. 16, 1961, Ser. No. 145,456
4 Claims. (Cl. 23—205)

This invention relates to a process for the separation and recovery of a boron halide from substantially anhydrous fluid mixtures, and more particularly relates to a process for the separation and recovery of a boron halide from substantially anhydrous fluid mixtures with a boron halide reactant comprising a metal halide. Still more particularly, this invention relates to a process for the separation and recovery of a boron halide from substantially anhydrous fluid mixtures with a boron halide reactant comprising a metal halide thereby reacting at least a portion of said boron halide with said metal halide, and subsequently recovering boron halide from said process.

The term "reaction" means a mechanism by which at least one component of a mixture selectively combines in some form with the solid or solids with which the mixture is contacted; such mechanisms may be adsorption, absorption, clathration, occlusion or chemical reaction, and all these mechanisms are generically designated herein as "reaction."

We have found that in the production of alkylated aromatic hydrocarbons utilizing a boron trifluoride-modified substantially inorganic oxide, alkylatable aromatic hydrocarbon, olefin-acting compound, and boron trifluoride, free boron fluoride will usually be found among the liquid hydrocarbon reaction products and unreactive off-gases. The recovery and reuse of boron fluoride, therefore, results in extraordinary economy of operation.

The principal object of the present invention is to provide a process for the efficient and economical separation and recovery of the boron fluoride from substantially anhydrous fluid mixtures. Another object of this invention is to provide a process whereby the boron halide can be separated continuously from the hereinbefore mentioned hydrocarbon reaction products without appreciable consumption and loss of the recovered boron halide. Other objects of this invention will be set forth hereinafter as part of the specifications and in the accompanying examples.

In one embodiment, the present invention relates to a process for the separation and recovery of a boron halide from substantially anhydrous fluid mixtures containing the same, which comprises contacting said fluid mixtures with a boron halide reactant comprising a metal halide thereby reacting at least a portion of said boron halide with said metal halide, and subsequently recovering boron halide from said process.

Another embodiment of the present invention relates to a process for the separation and recovery of a boron halide from a substantially anhydrous gaseous mixture containing the same, which comprises contacting said gaseous mixture with a boron halide reactant comprising a metal halide thereby reacting at least a portion of said boron halide with said metal halide, and subsequently recovering boron halide from said process.

A further embodiment of the present invention relates to a process for the separation and recovery of a boron halide from a substantially anhydrous liquid hydrocarbon containing the same, which comprises contacting said liquid hydrocarbon with a boron halide reactant comprising a metal halide thereby reacting at least a portion of said boron halide with said metal halide, and subsequently recovering boron halide from said process.

A specific embodiment of the present invention relates to a process for the separation and recovery of boron fluoride from a substantially anhydrous gaseous mixture containing the same, which comprises contacting said gaseous mixture with a boron fluoride reactant selected from the group consisting of a fluoride of a metal from Groups VI, VII and VIII of Period Four of the Periodic Table, thereby reacting at least a portion of said boron fluoride with said metal fluoride, and subsequently recovering boron fluoride from said process.

A further specific embodiment of the present invention relates to a process for the separation and recovery of boron fluoride from a substantially anhydrous gaseous mixture containing the same which comprises contacting said gaseous mixture with a boron fluoride reactant comprising ferrous fluoride in a reaction zone at reaction conditions including a temperature of from about 0° to about 300° C. and a pressure of from about atmospheric to about 200 atmospheres, thereby reacting at least a portion of said boron fluoride with said ferrous fluoride, and subsequently recovering boron fluoride from said process.

Another embodiment of the present invention relates to a process for the separation and recovery of boron fluoride from a substantially anhydrous liquid hydrocarbon containing the same, which comprises contacting said liquid hydrocarbon with a boron fluoride reactant selected from the group consisting of a fluoride of a metal from Groups VI, VII and VIII of Period Four of the Periodic Table in a reaction zone at reaction conditions including a temperature of from about 0° to about 300° C. and a pressure of from about atmospheric to about 200 atmospheres, thereby reacting at least a portion of said boron fluoride with said metal fluoride, and subsequently recovering boron fluoride from said process.

A still further specific embodiment of the present invention relates to a process for the separation and recovery of boron fluoride from substantially anhydrous liquid benzene containing the same, which comprises contacting said liquid benzene with a boron fluoride reactant comprising chromous fluoride in a reaction zone at reaction conditions including a temperature of from about 0° to about 300° C. and a pressure of from about atmospheric to about 200 atmospheres, thereby reacting at least a portion of said boron fluoride with said chromous fluoride, and subsequently recovering boron fluoride from said process.

Other embodiments of the present invention will become apparent in considering the specification as hereinafter set forth.

As set forth hereinabove, the present invention relates to a process for the separation and recovery of a boron halide from substantially anhydrous fluid mixtures utilizing a boron halide reactant comprising a metal halide as the reacting agent. Many suitable metal halides are utilizable as reaction agents in the process of this invention. In general, metal halides in which the metal is di- or tri-valent and is present in the low or intermediate valence state appear to be more effective and are preferred. These compounds include such substances as the halides of the metals of Groups VI, VII and VIII of the Periodic Table, such as chromous fluoride, chromous chloride, manganese difluoride, manganese dichloride, ferrous fluoride, ferrous chloride, cobaltous fluoride, cobaltous chloride, nickelous fluoride, etc. Of the above-mentioned metal halides, ferrous fluoride is preferred as the reaction agent for recovering boron fluoride.

Many fluid mixtures can be substantially purified utilizing the process of this invention. Typical gaseous mixtures include such components as hydrogen, methane, ethane, propane, inert gases, etc. Typical liquid hydrocarbon mixtures include those such as the paraffins, cycloparaffins, aromatics, etc. Typical paraffins are normal butane, isobutant, normal pentane, isopentane, neopentane, normal hexane, etc. Typical cycloparaffins are cyclopentane, methylcyclopentane, cyclohexane, methylcyclohexane, cycloheptane, cyclooctane, etc. Typical aromatic hydrocarbons include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, diethylbenzenes, triethylbenzenes, normal propylbenzenes, isopropylbenzenes, etc. Preferred hydrocarbons are monocyclic aromatic hydrocarbons, that is, benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecylbenzenes, pentadecylbenzenes, hexyltoluenes, nonyltoluenes, dodecyltoluenes, pentadecyltoluenes, etc. Very often alkylate is obtained as a high boiling fraction in which the alkyl group attached to the aromatic nucleus varies in size from about $C_9$ to $C_{18}$. Other typical aromatic hydrocarbons, which at specified reaction conditions, depending upon the melting point of the aromatic chosen, would be in liquid form, would include those aromatic hydrocarbons with two or more aryl groups such as diphenyl, diphenylmethane, naphthalene, triphenyl, triphenylmethane, fluorene, stilbene, etc. Examples of other aromatic hydrocarbons within the scope of this invention which at specified reaction conditions, depending upon the melting point of the aromatic chosen, would be in liquid form, include those containing condensed aromatic rings. These include naphthalene, alkylnaphthalenes, anthracene, phenanthrene, naphthacene, rubrene, etc. Of the above-mentioned aromatic hydrocarbons that could be utilized in the process of this invention, the benzene hydrocarbons are preferred, and of the preferred benzene hydrocarbons, benzene itself is particularly preferred.

In accordance with the process of the present invention, the separation and recovery of boron halide from substantially anhydrous fluid mixtures is effected by contacting said fluid mixtures with a boron halide reactant comprising a metal halide at a temperature of from about 0° C. or lower to about 300° C. or higher, and preferably from about 10° C. to about 70° C., although the exact temperature needed will depend upon the particular fluid to be purified and the particular metal halide utilized. The lower temperature limit is one at which the metal halide-boron halide complex is stable, while the upper temperature limit lies below the decomposition temperature of the metal halide-boron halide complex. The reaction process is usually carried out at a pressure of from about atmospheric to about 200 atmospheres. The pressure utilized is usually selected to effect the desired selective reaction. The reaction bed is then periodically regenerated for use by heating the boron halide-saturated metal halide to a temperature above that used during reaction and preferably about 150° C. when the reaction temperature is below 150° C. where boron halide is evolved and the metal halide regenerated for reuse. The decomposition of the boron halide-saturated metal halide may be conducted in the presence of the fluid mixture if desired.

In separating the hereinbefore mentioned boron halide from a substantially anhydrous fluid mixture with the type of reaction media herein described, either batch or continuous operations may be employed. Although the invention is particularly applicable to the separation and recovery of boron fluoride from gaseous mixtures it may also be used for the separation of boron chloride or other boron halides from such mixtures when present alone or in admixture with boron fluoride. The actual operation of the process may be either upflow or downflow. The details of processes of this general character are familier to those skilled in the art and any necessary additions or modifications of the above general procedures will be more or less obvious and can be made without departing from the broad scope of this invention.

The process of the present invention is illustrated by the following examples which are introduced for the purpose of illustration only and with no intention of unduly limiting the generally broad scope of the invention.

EXAMPLE I

This example illustrates the effectiveness of the separation and recovery of a boron halide from a substantially anhydrous fluid mixture utilizing the process of the present invention.

The following technique was involved. Sixty milliliters of the boron halide reactant, namely ferrous fluoride deposited on charcoal, was placed in a reaction zone forming a bed 6½ inches in length. A 2.86 weight percent boron trifluoride-balance nitrogen mixture was passed downflow through the reactant at 425 p.s.i.g. and 25° C. The gas flow rate equalled from 0.17–0.19 cubic foot per hour at 0° C. and 760 mm. After depressuring the reaction zone to determine if any of the boron trifluoride reacted could be liberated by a pressure difference, the boron trifluoride recovery cycle was started. It consisted of determining the amounts of boron trifluoride which could be liberated at various temperatures while flushing with high surface sodium-dried nitrogen.

The boron trifluoride pick-up by the boron halide reactant was calculated from the amount of nitrogen exiting from the reaction zone minus any boron trifluoride contained therein. The amount of boron trifluoride picked up during the depressuring portion of the cycle was included in the total boron trifluoride pick-up. In all cases, this gas was passed through a series of three stainless steel scrubbers containing iced water. The resulting scrubber solutions were analyzed for boron content by spectrophotometric measurement of the absorbance of the complex of carminic acid and boron.

As shown in the summary of Test 1 in Table I, boron trifluoride was completely removed from the 2.86 weight percent boron trifluoride-balance nitrogen stock at 25° C. and 400 p.s.i.g. by passage over the ferrous fluoride. No boron trifluoride was liberated by releasing the pressure of 425 p.s.i.g. to atmospheric. It is believed that if a $Fe(BF_4)_2$ complex was formed it could have dissociated and liberated boron trifluoride and could have combined with unreacted ferrous fluoride further down the bed and thus escaped detection.

As indicated in portions (a) and (b) of the recovery cycle shown in Table I, the ferrous fluoborate did not appreciably dissociate at 24° C. and 100° C. respectively while passing dry nitrogen through the bed in order to remove the boron trifluoride. However, at 200° C., the rate of boron trifluoride liberation was at least three-fold that at 100° C., as indicated in portions (c) and (d) of the recovery cycle. Approximately 52% of the boron trifluoride picked up was recovered during the cycle.

As shown in the summary of Test 2 in Table I, the boron trifluoride reaction cycle was repeated at about similar conditions. Although 25 milligrams of boron trifluoride (of 2,189 charged) was accounted for in the exit gas from the reaction zone during this part of the cycle, it is probable that this amount of boron trifluoride did not escape the reaction agent but was flushed by the nitrogen from the downstream plant hardware. Boron trifluoride pick-up was still in excess of 99 weight percent.

The boron trifluoride recovery cycle was effected at a temperature 50° lower than the previous cycle in order to eliminate removal of any boron trifluoride remaining from the first recovery cycle, which was carried out at 200° C. The recovery of the boron trifluoride from this latter reaction cycle amounted to 79.6% of that originally picked up. Most of the boron trifluoride (78.5% of that picked up) was released during the first sixteen hours of the recovery cycle at 150° C., as indicated in portion (e) of the recovery cycle; thereafter, under similar conditions for twelve hours, only 1.1% of the boron trifluoride picked up and was released, as indicated in portion (f) of the recovery cycle. The more complete removal of the boron trifluoride from the ferrous fluoride reaction agent probably occurred after equilibrium was established between the charcoal and the boron trifluoride.

EXAMPLE III

This example illustrates the effectiveness of the present invention in separating and recovering boron halide from a substantially anhydrous fluid mixture comprising a liquid hydrocarbon and boron trifluoride. The same general processing technique as utilized in Examples I and II are also used in this example.

Sixty milliliters of the boron halide reactant, namely ferrous fluoride deposited on charcoal, is placed in the reaction zone. The substantially anhydrous liquid hydrocarbon containing boron trifluoride, namely benzene, is passed downflow through the reactant at 500 p.s.i.g. and 50° C. After depressuring the reaction zone to deter-

*Table I.—Utilization of ferrous flouride as reaction agent*

| Boron halide reactant fluid mixture | Ferrous fluoride on charcoal 2.86 Wt. percent BF₃—97.14 Wt. percent N₂ | | | | | | | | |
|---|---|---|---|---|---|---|---|---|---|
| | Hours | Temp., °C. | Press., p.s.i.g. | Reaction zone exit gas, ft. 3/hr. | BF₃, mg. | | | | Percent BF₃ recovered* |
| | | | | | Charged | Leaked through | Picked-up | Recovered | |
| CYCLE TYPE | | | | | | | | | |
| Test 1: | | | | | | | | | |
| Charging | 6.0 | 25 | 425 | 0.19 | 1,197 | <1 | 0 | 0 | 0 |
| Depressuring | 6.5 | 26 | 425-0 | 0.14 | 913 | <1 | 0 | 0 | 0 |
| Recovery (a) | 3.0 | 24 | 0 | 0.13 | 0 | 0 | | <1 | 0 |
| Recovery (b) | 3.8 | 100 | 0 | 0.14 | 0 | 0 | | 70 | 3.3 |
| Recovery (c) | 17.3 | 100 | 0 | 0.09 | 0 | 0 | | 228 | 10.8 |
| Recovery (d) | 17.0 | 200 | 0 | 0.09 | 0 | 0 | | 793 | 37.6 |
| Total | | | | | 2,110 | <1 | 2,110 | 1,092 | 51.7 |
| Test 2: | | | | | | | | | |
| Charging | 10.0 | 25 | 450 | 0.17 | 1,810 | 17 | 0 | 0 | 0 |
| Depressuring | 3.5 | 24 | 450-0 | 0.10 | 379 | 8 | 0 | 0 | 0 |
| Recovery (e) | 16.3 | 150 | 0 | 0.20 | 0 | 0 | | 1,698 | 78.5 |
| Recovery (f) | 11.7 | 150 | 0 | 0.25 | 0 | 0 | | 24 | 1.1 |
| Total | | | | | 2,189 | 25 | 2,164 | 1,722 | 79.6 |

*Based on BF₃ picked-up.

EXAMPLE II

This example utilizes the same processing techniques described in Example I but utilizes 60 milliliters of cobaltous fluoride deposited on charcoal as the boron halide reactant.

The cobaltous fluoride is placed in the reaction zone and the same boron trifluoride-nitrogn mixture utilized in Example I, is passed upflow through the reactant at 500 p.s.i.g. and 40° C. After the reaction zone is depressured to determine if any of the boron trifluoride reacted could be liberated by a pressure difference, the boron trifluoride recovery cycle is started. The amounts of boron trifluoride liberated at various temperatures are determined while flushing with high surface sodium-dried nitrogen.

The boron trifluoride pick-up by the boron halide reactant is calculated from the amount of nitrogen exiting from the reaction zone minus any boron trifluoride contained therein. The amount of boron trifluoride picked up during the depressuring portion of the cycle is included in the total boron trifluoride pick-up. In all cases, this gas is passed through a series of stainless steel containers containing iced water. The resulting scrubber solutions are analyzed for boron content by spectrophotometric measurement of the absorbance of the complex of carminic acid and boron.

The boron trifluoride is substantially removed from the boron trifluoride-nitrogen mixture at 40° C. and 500 p.s.i.g. by passage over the cobaltous fluoride. No boron trifluoride is liberated by releasing the pressure of 500 p.s.i.g. to atmospheric. Satisfactory recovery of the boron trifluoride is accomplished at a temperature of about 150° C. and atmospheric pressure. The cobaltous fluoride is thereby regenerated for re-use.

mine if any of the boron trifluoride reacted could be liberated by a pressure difference, the boron trifluoride recovery cycle is started. The amounts of boron trifluoride liberated at various temperatures are determined while flushing with high surface sodium-dried nitrogen.

The boron trifluoride pick-up by the boron halide reactant is calculated from the amount of nitrogen exiting from the reaction zone minus any boron trifluoride contained therein. The amount of boron trifluoride picked up during the depressuring portion of the cycle is included in the total boron trifluoride pick-up. In all cases, this gas is passed through a series of three stainless steel containers containing iced water. The resulting scrubber solutions are analyzed for boron content by spectrophotometric measurement of the absorbance of the complex of carminic acid and boron.

The boron trifluoride is substantially removed from the boron trifluoride-benzene mixture at 50° C. and 500 p.s.i.g. by passage over the ferrous fluoride. No boron trifluoride is liberated by releasing the pressure of 500 p.s.i.g. to atmospheric. Satisfactory recovery of the boron trifluoride is accomplished at a temperature of about 170° C. and atmospheric pressure. The ferrous fluoride is thereby regenerated for re-use.

EXAMPLE IV

This example illustrates the effectiveness of the process of the present invention in separating and recovering a boron halide from a substantially anhydrous fluid mixture comprising a liquid hydrocarbon and boron trifluoride. The same general processing techniques utilized in the preceding examples are also used in this example.

Sixty milliliters of the boron halide reactant, namely manganese difluoride deposited on charcoal, is placed in the reaction zone. The substantially anhydrous liquid hydrocarbon containing boron trifluoride, namely benzene, is passed upflow through the sorbent at 300 p.s.i.g. and 70° C. After depressuring the reaction zone to determine if any of the boron trifluoride reacted could be liberated by a pressure difference, the boron trifluoride recovery cycle is started. The amounts of boron trifluoride liberated at various temperatures are determined while flushing with high surface sodium-dried nitrogen. As before, the boron trifluoride pick-up by the boron halide reactant is calculated from the amount of nitrogen exiting from the reaction zone minus any boron trifluoride contained therein. The amount of boron trifluoride picked up during the depressuring portion of the cycle is included in the total boron trifluoride pick-up. In all cases, this gas is passed through a series of three stainless steel scrubbers containing iced water. The resulting scrubber solutions are analyzed for boron content by spectrophotometric measurement of the absorbance of the complex of carminic acid and boron.

The boron trifluoride is substantially removed from the boron trifluoride-benzene mixture at 70° C. and 300 p.s.i.g. by passage over the manganese difluoride. No boron trifluoride is liberated by releasing the pressure of 300 p.s.i.g. to atmospheric. Satisfactory recovery of the boron trifluoride is accomplished at a temperature of about 150° C. and a atmospheric pressure. The manganese difluoride is thereby regenerated for re-use.

We claim as our invention:

1. A process for the separation and recovery of a boron halide from a substantially anhydrous, normally liquid hydrocarbon containing the same, which comprises contacting said hydrocarbon with a halide of a metal selected from the group consisting of the metals in Groups VI, VII and VIII of Period Four of the Periodic Table at conditions to form a complex of the boron halide and metal halide, and subsequently heating said complex sufficiently to decompose the complex and liberate the boron halide therefrom.

2. The process of claim 1 further characterized in that said liquid hydrocarbon is an aromatic hydrocarbon.

3. The process of claim 1 further characterized in that said liquid hydrocarbon is a benzene hydrocarbon.

4. The process of claim 1 further characterized in that said liquid hydrocarbon is benzene.

References Cited by the Examiner

UNITED STATES PATENTS

| | | |
|---|---|---|
| 2,135,458 | 11/38 | Schultz. |
| 2,628,991 | 2/53 | Schneider et al. _____ 23—205 X |

MAURICE A. BRINDISI, *Primary Examiner.*